United States Patent
Tom et al.

(10) Patent No.: US 6,817,648 B1
(45) Date of Patent: Nov. 16, 2004

(54) SUN VISOR ASSEMBLY WITH REINFORCING CORE PLATE

(75) Inventors: Mark A. Tom, Coldwater, MI (US); Keith R. Boyle, Hillsdale, MI (US)

(73) Assignee: Crotty Corporation, Quincy, MI (US)

( * ) Notice: Subject to any disclaimer, the term of this patent is extended or adjusted under 35 U.S.C. 154(b) by 0 days.

(21) Appl. No.: 10/619,218

(22) Filed: Jul. 14, 2003

(51) Int. Cl.⁷ ................................................ B60J 3/02
(52) U.S. Cl. ................................ 296/97.11; 296/97.12
(58) Field of Search ............................ 296/97.11, 97.1, 296/97.8, 97.12

(56) References Cited

U.S. PATENT DOCUMENTS 4,998,765 A * 3/1991 Van Order et al. ...... 296/97.11
5,823,603 A    10/1998 Crotty, III

* cited by examiner

Primary Examiner—Joseph D. Pape
(74) Attorney, Agent, or Firm—Rader, Fishman & Grauer, PLLC

(57) ABSTRACT

A sun visor assembly is provided that includes an outer covering having two covering halves. A reinforcing core plate is attached to one of the covering halves. An upper edge of the reinforcing core plate includes a support flange that cooperates with the reinforcing core plate to define a channel. At least one visor core component is received within the channel and rotatably engages a visor support rod.

15 Claims, 8 Drawing Sheets

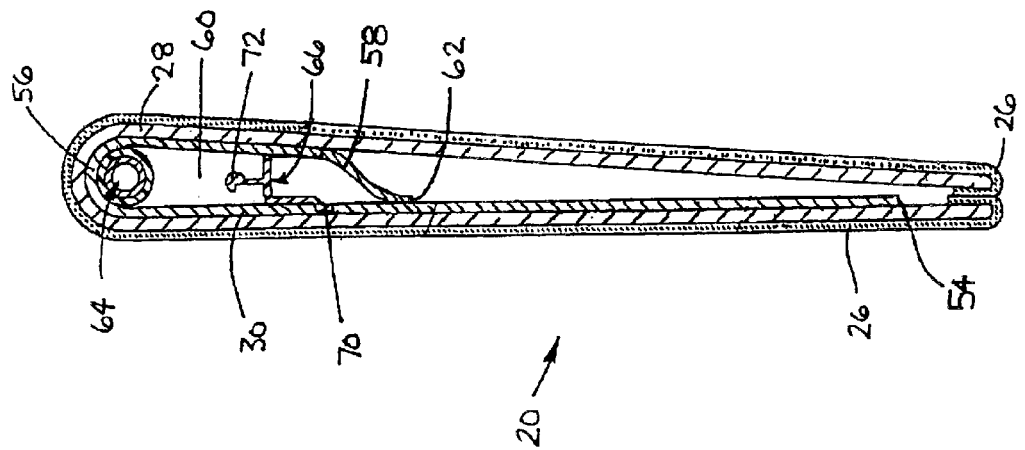
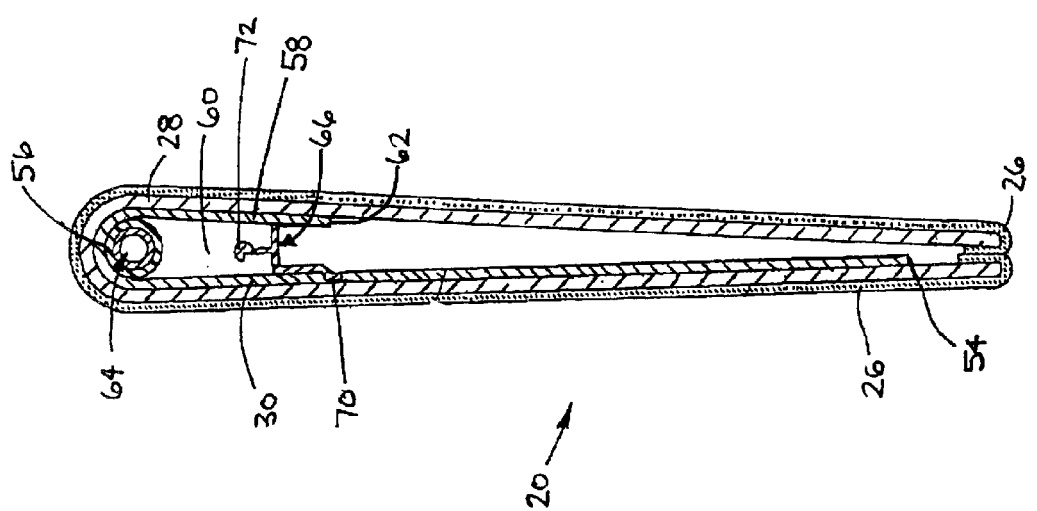

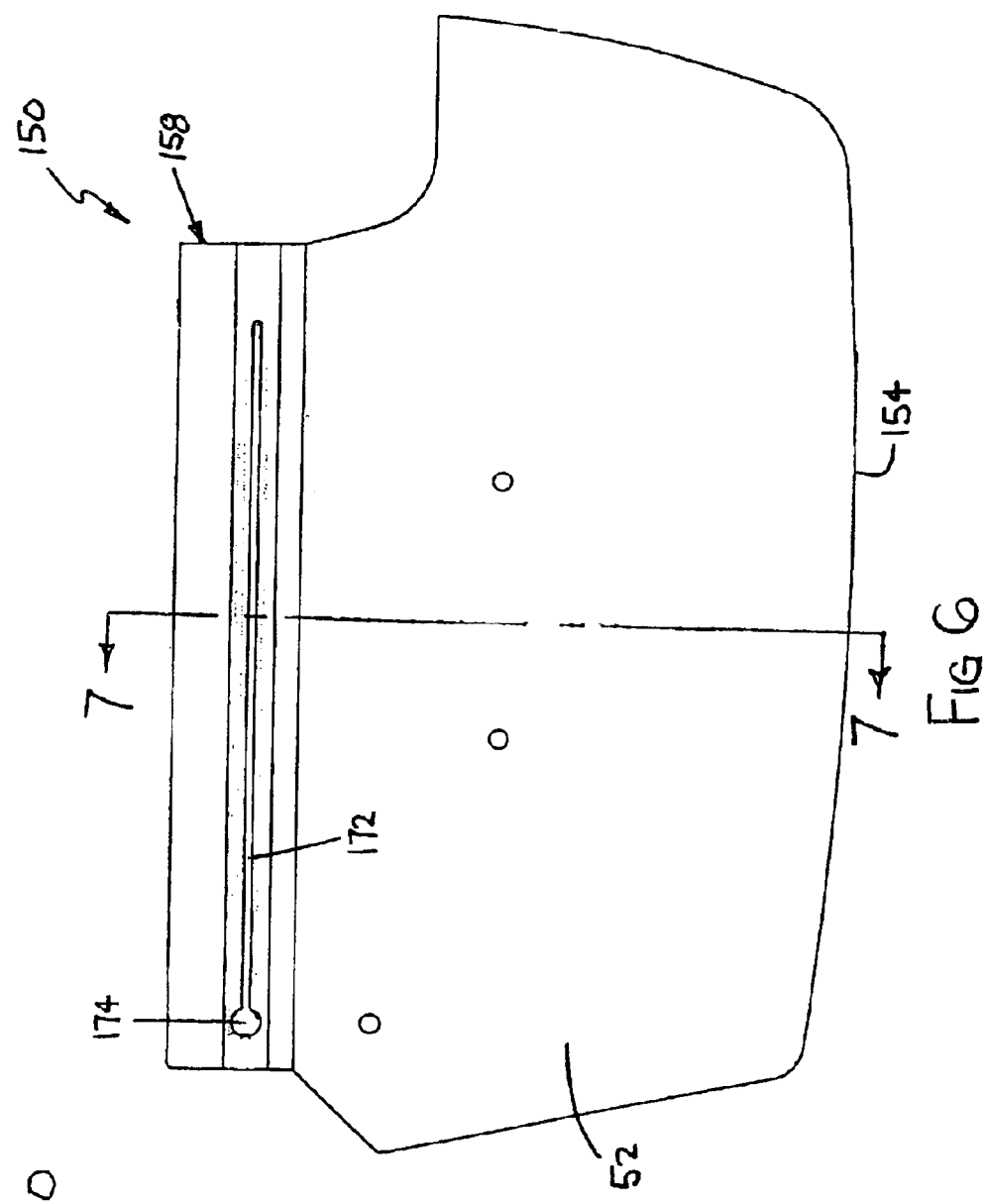
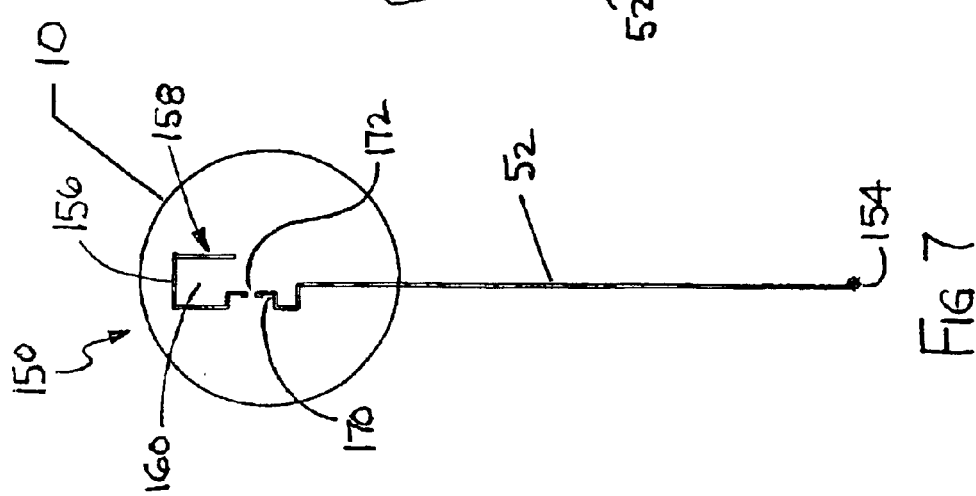

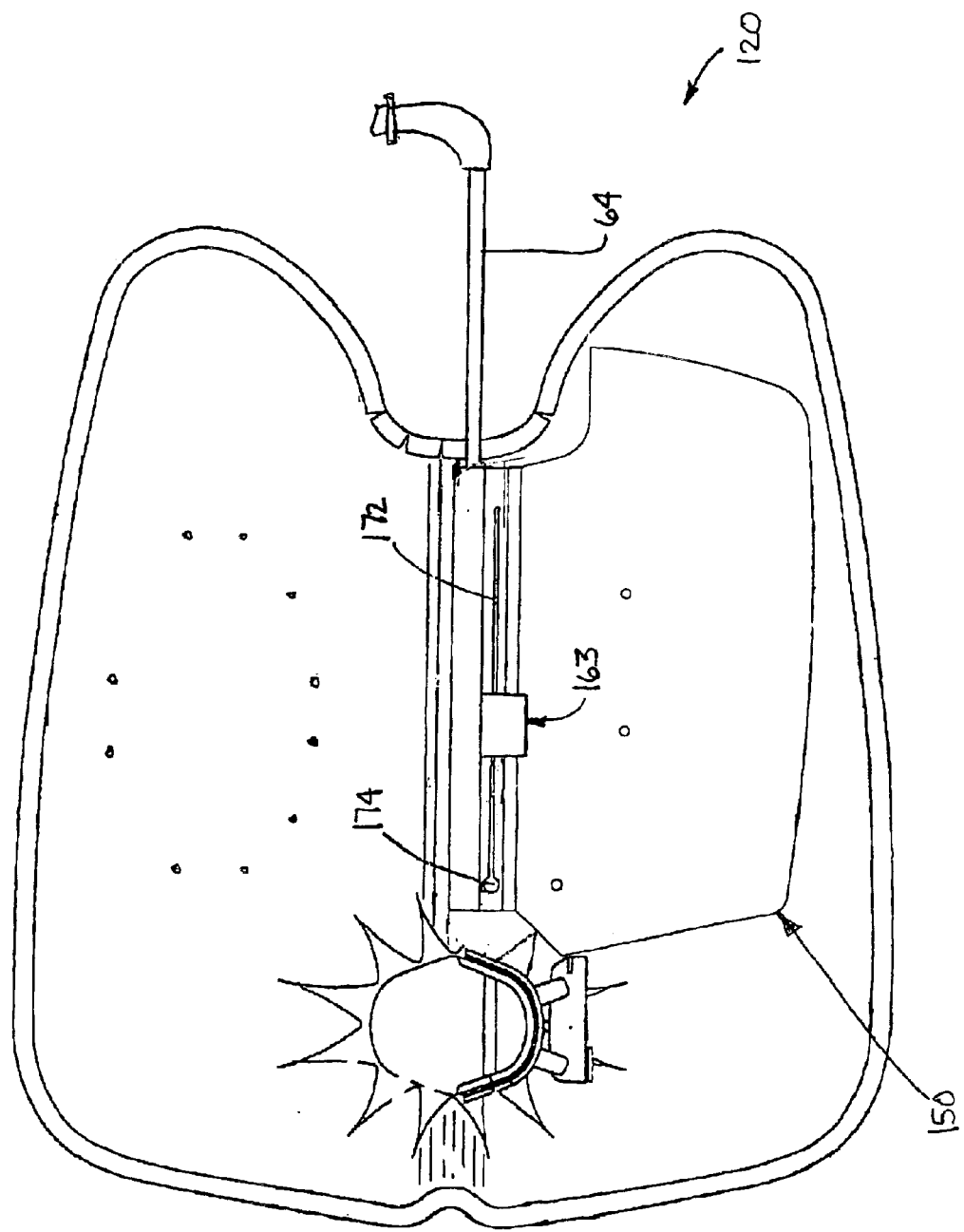

SUN VISOR ASSEMBLY WITH REINFORCING CORE PLATE

BACKGROUND OF THE INVENTION

1. Field of the Invention

The present invention relates to sun visors for vehicles and more particularly to a sun visor assembly having an outer covering that includes a reinforcing core plate.

2. Description of the Related Art

It is well known to provide a sun visor for the windshield of a vehicle, wherein the sun visor is mounted on the vehicle body roof for movement between a storage position adjacent the vehicle headliner, a first use position adjacent the windshield, and a second use position adjacent a side door window opening. One known sun visor includes a solid inner core of pressed wood material and an outer covering of foam-backed cloth adhered to or otherwise affixed to a kraft paper foundation. The covering is folded over the core and is edge sewn along a seam circumjacent the periphery of the core.

More recently, there has been developed a sun visor assembly that includes a number of modular core components secured within a cloth covered kraft paper foundation. To provide the necessary rigidity and support, the kraft paper foundation is thickened and a reinforcing adhesive is applied around the periphery of the foundation to secure the foundation halves together. The thickened foundation and reinforcing adhesive inhibit flexion of the sun visor during movement thereof. While the aforementioned sun visors are a robust design, manufacturers continue to improve upon these designs to reduce material and manufacturing costs, while enhancing rigidity and resistance to flexion.

SUMMARY OF THE INVENTION

A sun visor assembly is provided that includes an outer covering having two covering halves. A reinforcing core plate is attached to one of the covering halves. An upper edge of the reinforcing core plate includes a support flange that cooperates with the reinforcing core plate to define a channel. At least one visor core component is received within the channel and rotatably engages a visor support rod.

In an embodiment of the invention, the core plate is made of sheet-metal that is formed to create the support flange. The reinforcing core plate permits the outer covering to be manufactured out of inexpensive, less reinforcing materials or out of traditional covering materials having a substantially thinner cross-section. The reinforcing core plate also functions to eliminate structural adhesives used to secure the cover halves together and provide reinforcement. The reinforcing core plate accomplishes these functions without sacrificing rigidity or resistance to flexion, and even improves these properties.

BRIEF DESCRIPTION OF THE DRAWINGS

Embodiments of the invention will now be described, by way of example, with reference to the accompanying drawings, wherein:

FIG. 5A is a cross-sectional view taken along lines 5–5 in FIG. 1;

FIG. 5B is a cross-sectional view of a sun visor assembly according to another embodiment of the present invention.

FIG. 6 is a front elevational view of a reinforcing core plate according to another embodiment of the present invention;

FIG. 7 is a cross-sectional view of the reinforcing core plate shown in FIG. 6;

FIG. 11 is a plan view of a sun visor assembly according to an embodiment of the present invention, showing the reinforcing core plate of FIGS. 6 and 7.

DETAILED DESCRIPTION

Figure 1:
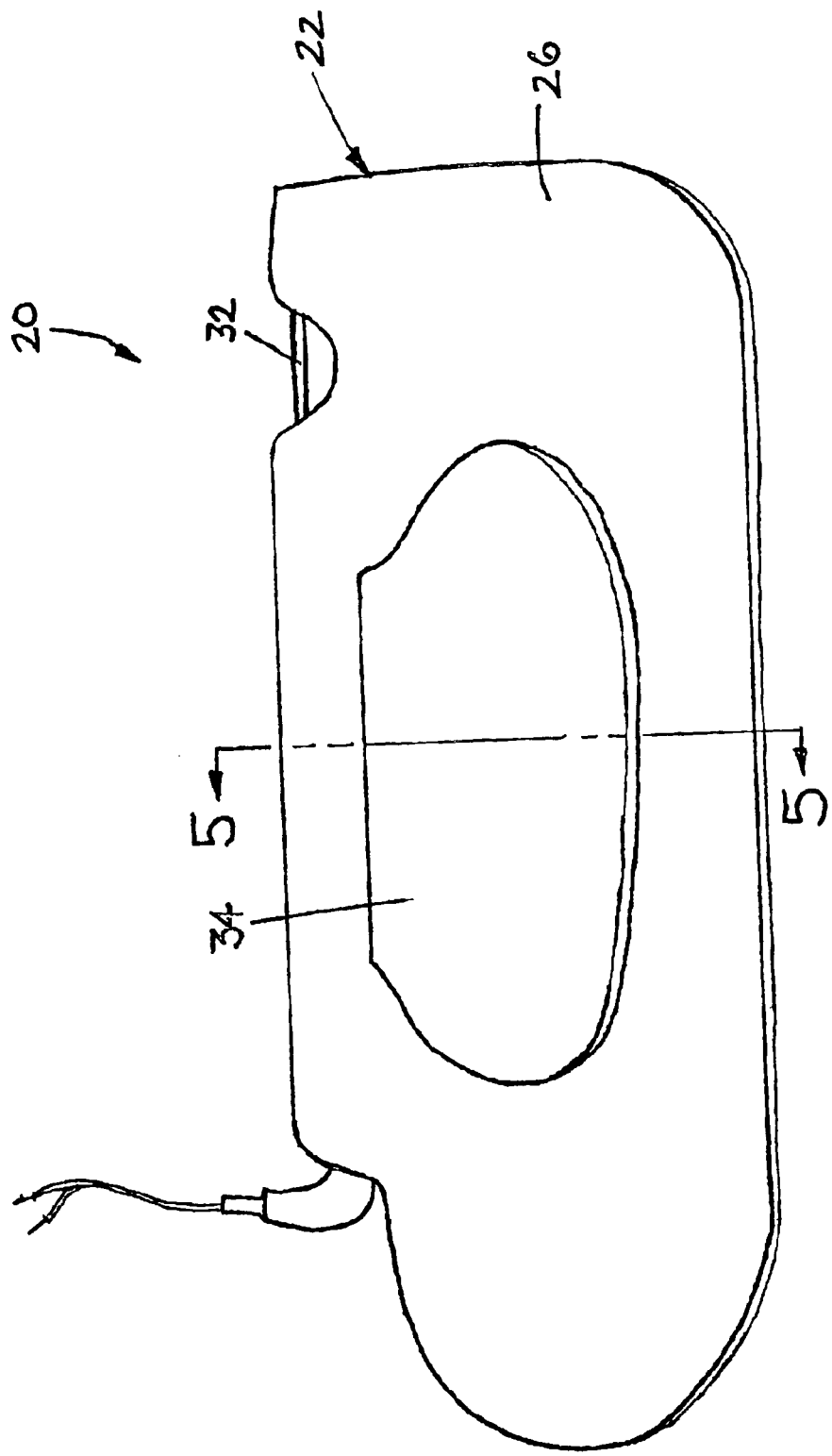
FIG. 1 is a perspective view of a sun visor assembly according to an embodiment of the present invention.

Referring now to the drawings, the preferred illustrative embodiments of the present invention are shown in detail. Although the drawings represent some preferred embodiments of the present invention, the drawings are not necessarily to scale and certain features may be exaggerated to better illustrate and explain the present invention. Further, the embodiments set forth herein are not intended to be exhaustive or otherwise limit or restrict the invention to the precise forms and configurations shown in the drawings and disclosed in the following detailed description.

Figure 2:
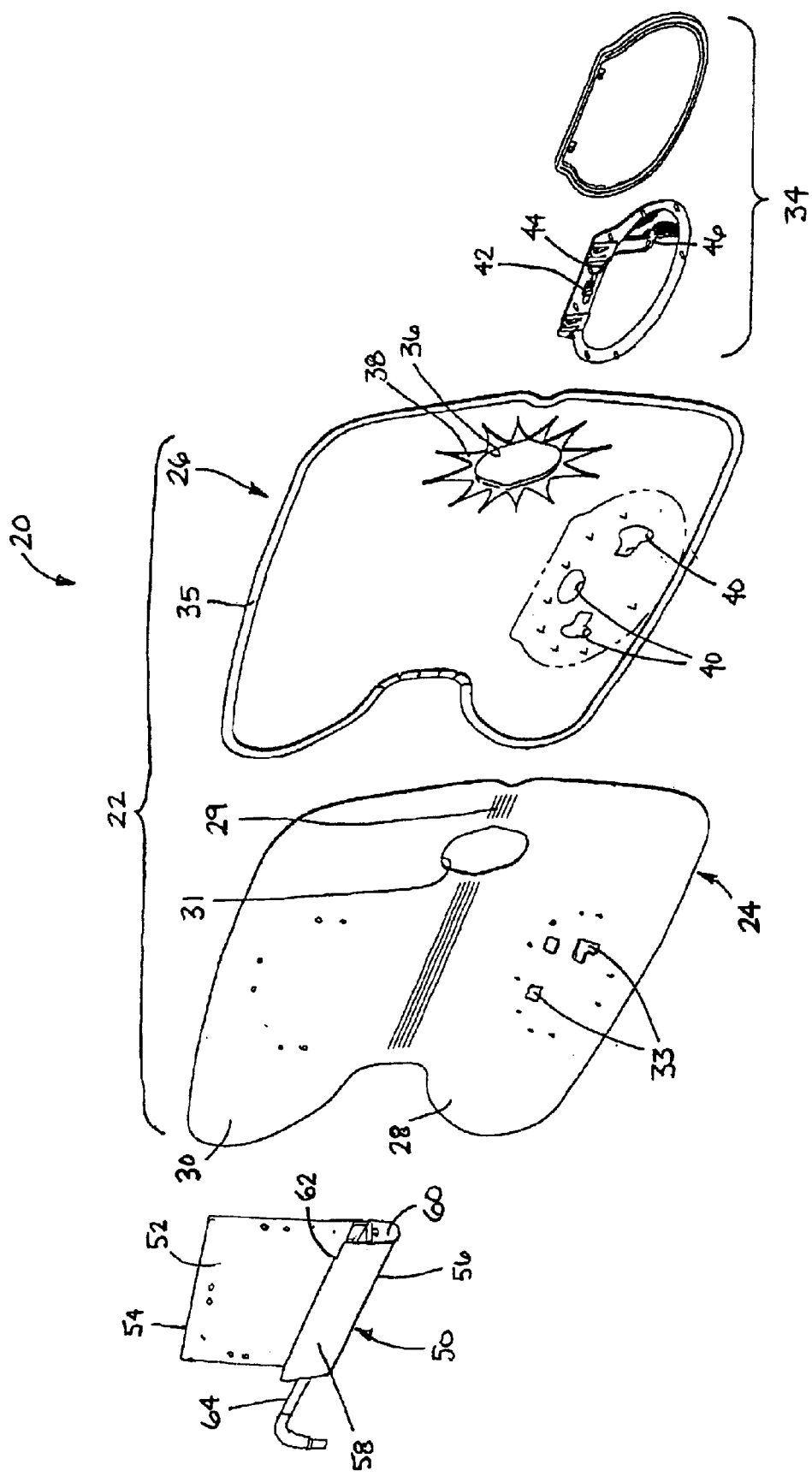
FIG. 2 is an exploded perspective view of a sun visor assembly according to an embodiment of the present invention.

Referring to FIGS. 1 and 2, there is shown a sun visor assembly 20 having an outer covering 22 that includes a rigid or semi-rigid foundation 24 and an exterior upholstery cover 26 overlaying foundation 24. In an embodiment, foundation 24 is made of a semi-rigid foam material having a hardness of less than about 50 Shore A. An exemplary foam material is the product marketed under the name Volara, which is sold by Voltek, a Division of Sekisui America Corporation. Use of a semi-rigid foam material satisfies passenger safety regulations promulgated by international automotive authorities, which require that a sun visor substrate, such as foundation 24, include a rounded edge having a radius of at least 3.2 mm or a Shore A hardness of less than 50. However, where the sun visor is not required to comply with the requirements of international automotive authorities, foundation 24 may be made out of more traditional materials, such as kraft paper, having a thickness that is significantly thinner than the foundations included in comparably equipped prior art sun visor assemblies.

Foundation 24 includes two halves 28 and 30. Foundation halves 28, 30 may be integrally formed, as shown in FIG. 2, or may be discrete and attached together during assembly of sun visor assembly 20. When halves 28 and 30 are integrally formed, foundation 24 is folded unto itself about one or more score lines 29 that define a "living hinge" between foundation halves 28, 30. Foundation 24 may also include a cut-out 31 to accommodate a pin assembly 32, and one or more apertures 33 to accommodate various components of a vanity mirror assembly 34.

In the illustrated embodiment, cover 26 is a decorative upholstery material, such as foam-backed cloth, vinyl and the like. Cover 26 includes a peripheral edge 35 that folds around the periphery of foundation 24 and is adhesively or otherwise bonded thereto. During visor construction, a second adhesive is applied around the interior periphery of foundation 24, and halves 28, 30 are folded about score lines 29 and bonded together. Cover 26 includes an aperture 36 that matches cut-out 31 to accommodate pin assembly 32. Cover 26 includes a saw-tooth edge 38 that folds to the inside of foundation 24 and is bonded thereto by the same adhesive used for edge 35. Optionally, apertures 40 can be precut into cover 26 to facilitate a wiring switch assembly 42, wires 44 and lighting fixture 46 provided on the back of vanity mirror assembly 34.

Sun visor assembly 20 also includes a reinforcing core plate 50 that is secured to outer covering 22. In an embodiment, core plate 50 includes a substantially planar portion 52 that extends from a first edge 54 to a second edge 56, and a support flange 58 that extends from planar portion 52 proximate second edge 56. In a particular configuration, planar portion 52 and support flange 58 cooperatively define a channel 60. Upper edge 56 may be generally rounded to match the rounded upper edge of outer cover 22. Optionally, upper edge 56 may be substantially semi-circular in cross-section having a radius of at least about 3.2 mm to comply with the requirements of international automotive authorities.

A distal end 62 of support flange 58 may be removed from planar portion 52, as shown in FIG. 5A, or may be in contact with planar portion 52, as shown in FIG. 5B. Optionally, distal end 62 may be secured to planar portion 52, such as by welding the features together, to enclose channel 60.

In an embodiment, reinforcing core plate 50 is formed of sheet-metal, such as steel or aluminum. The shape of core plate 50, as well as the support flange 58, is made by stamping, roll forming and/or bending the sheet-metal material into the desired shape. It will also be appreciated that core plate 50 can be made of a rigid plastic, such as ABS or polypropylene, in a suitable injection molding operation. In the illustrated embodiment, core plate 50 is heat-staked to outer covering 22, particularly foundation half 30, using deformable plastic stakes (not shown); however, any suitable means of securing core plate 50 to outer covering 22 may be employed, such as adhering core plate 50 to outer covering 22.

Figure 3:
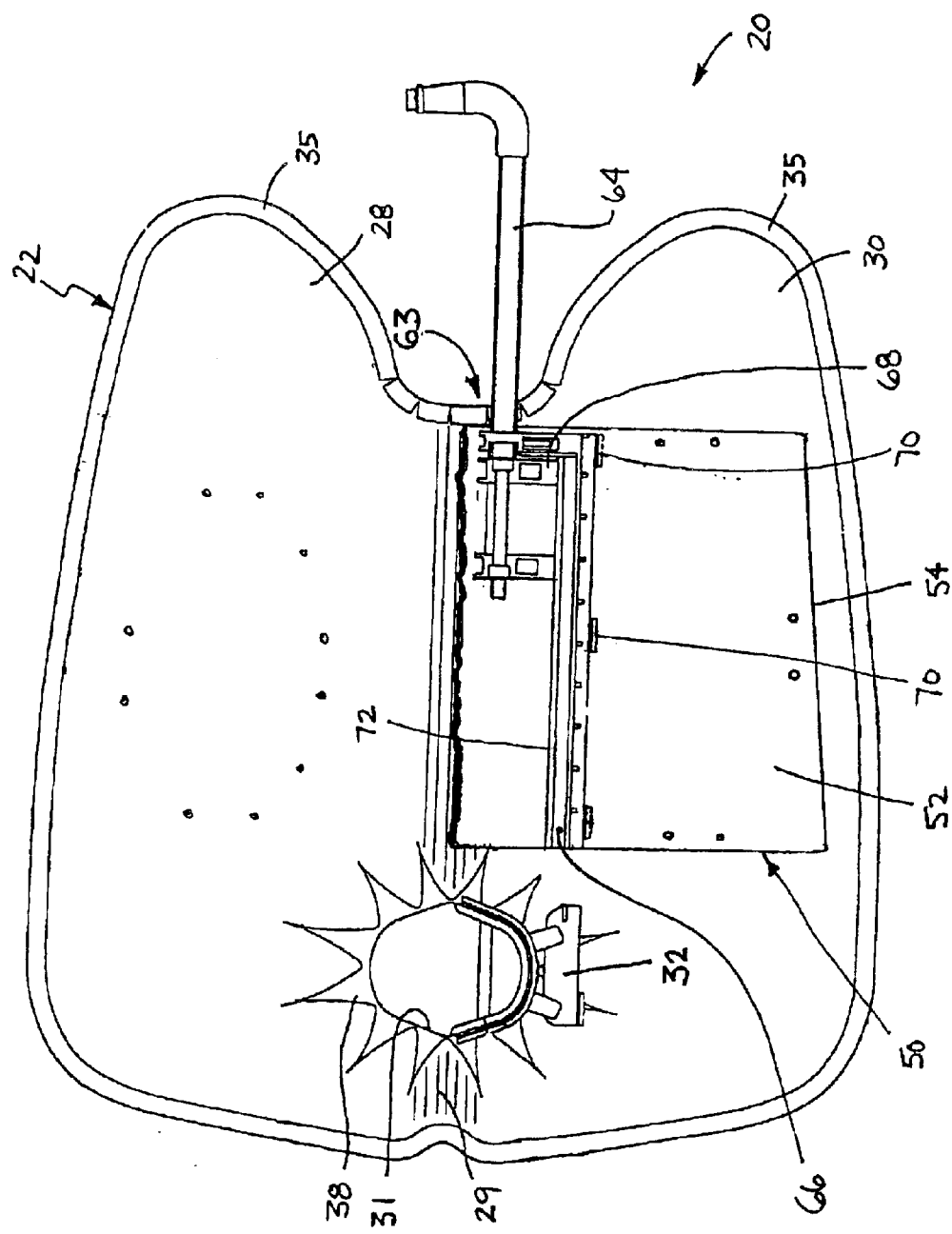
FIG. 3 is a plan view of the sun visor assembly of FIG. 2, showing the reinforcing core plate without the support bracket.
Figure 4:
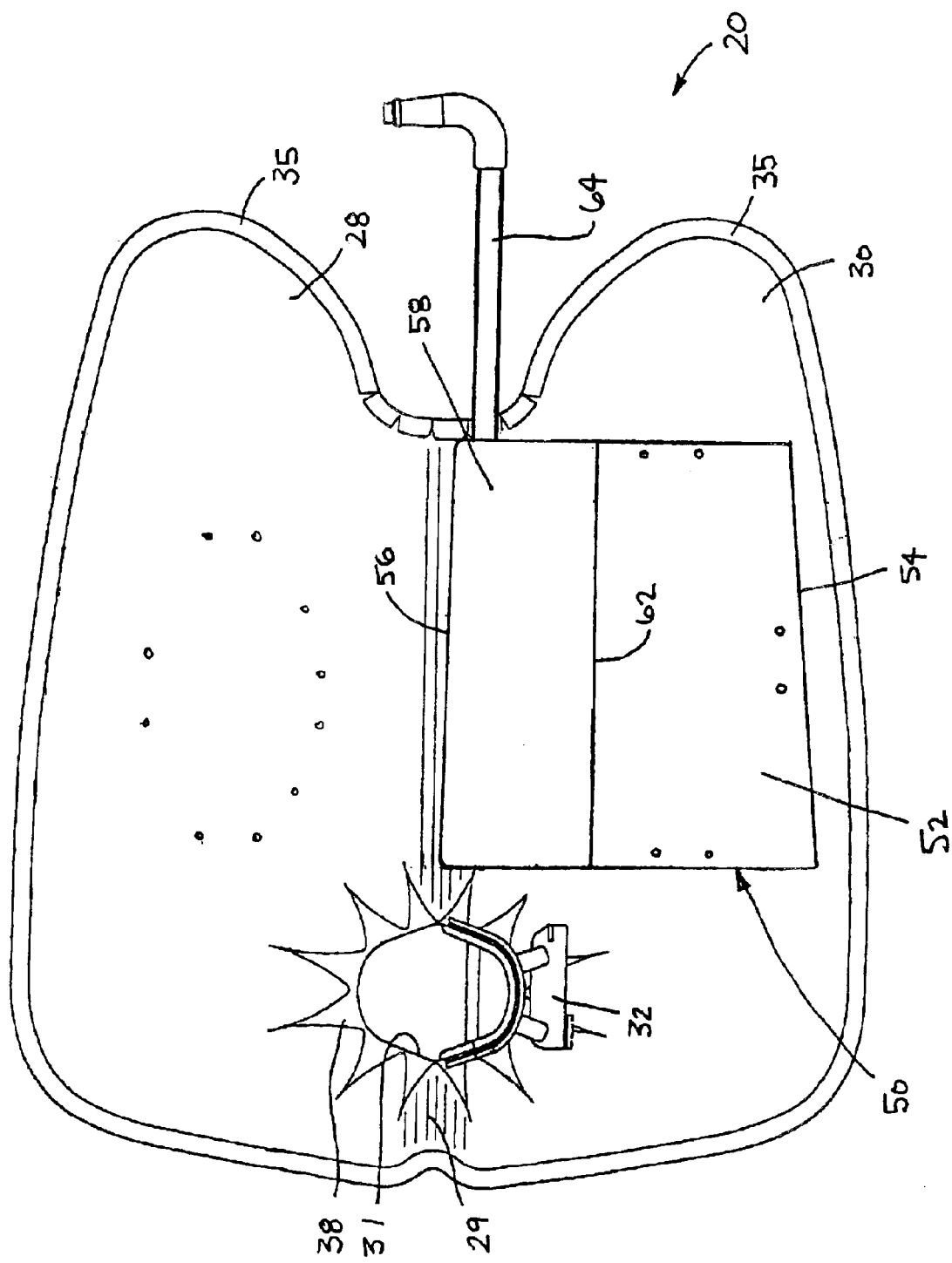
FIG. 4 is the plan view of FIG. 3 showing the support bracket.

Included within channel 60 is at least one core component 63 that rotatably engages a sun visor support rod 64. In the embodiment shown in FIG. 3, the core component 63 includes a track 66, which is commonly referred to as a support bracket, and a sliding member 68, which is commonly referred to as a hinge block. A support bracket and hinge block similar to those disclosed in FIG. 3 are described in U.S. Pat. No. 5,823,603, which is owned by the assignee of the present invention, and is hereby incorporated by reference in its entirety.

Referring to FIG. 5, track includes a rail 72 upon which sliding member 68 is slidingly disposed. Track 66 also includes core alignment elements 70, which holding track 66 in place within channel 60. In the configuration shown in FIGS. 3 and 5, core alignment elements 70 include upstanding pegs integrally molded with track 66 and which extend from a plurality of locations thereon. Core alignment elements 70 interfit with holes located in reinforcing core plate 50 and are configured to frictionally engage the surfaces of core plate 50 that define the holes. Core alignment elements 70 are placed so as to correctly position visor core component 63 within sun visor assembly 30. While core alignment elements 70 are shown in the disclosed embodiment as including upstanding pegs, other means of securing track 66 to core plate 50 are also contemplated. For example, track 66 could be welded or adhered to core plate 50.

Referring to FIGS. 6–10 another embodiment of the present invention is shown. In this embodiment, a sun visor 120 is provided that includes a reinforcing core plate 150 and core component 163. Reinforcing core plate 150 includes a substantially planar portion 152 that extends from a first edge 154 to a second edge 156, and a support flange 158 that extends from planar portion 152 proximate second edge 156. In a particular configuration, planar portion 152 and support flange 158 cooperatively define a channel 160. Upper edge 156 may be generally rectangular in cross-section, as shown in FIG. 7 or slightly rounded to match the rounded upper edge of sun visor 120. For example, upper edge 156 may be substantially semi-circular in cross-section having a radius of at least about 3.2 mm to comply with the requirements of international automotive authorities. Similarly, lower edge 154 may also be rounded having a radius of at least 3.2 mm.

Unlike reinforcing core plate 50 described above, support flange 158 in core plate 150 may slightly protrude from both sides of planar portion 152. When so configured, channel 160 is more centered over planar portion 158, minimizing the extent to which support flange extends from any one side of planar portion 158.

In a particular embodiment, support flange 158 includes an elongated recessed groove 170. A portion of groove 170 is provided with an elongated opening 172. Optionally, as illustrated in FIG. 6, at least one end of opening 172 may include an enlarged end portion 174.

Figure 8:
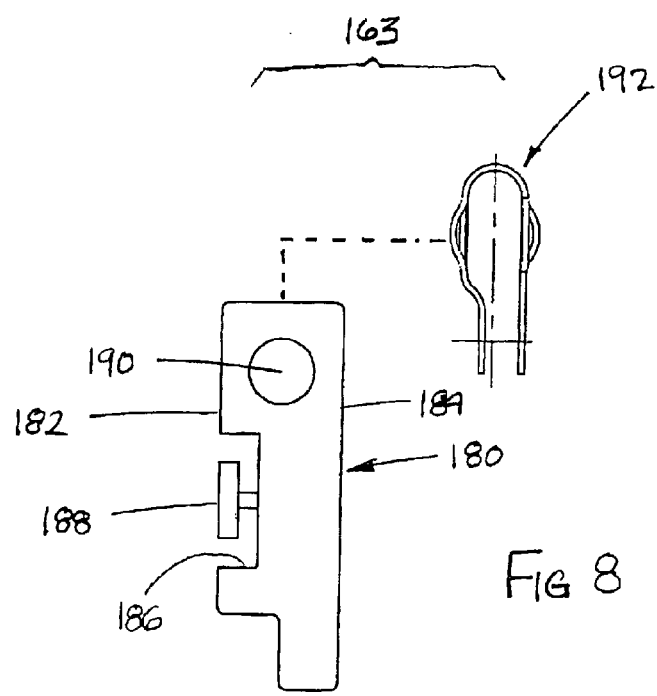
FIG. 8 is an exploded view of a hinge block according to an embodiment of the present invention.
Figure 9:
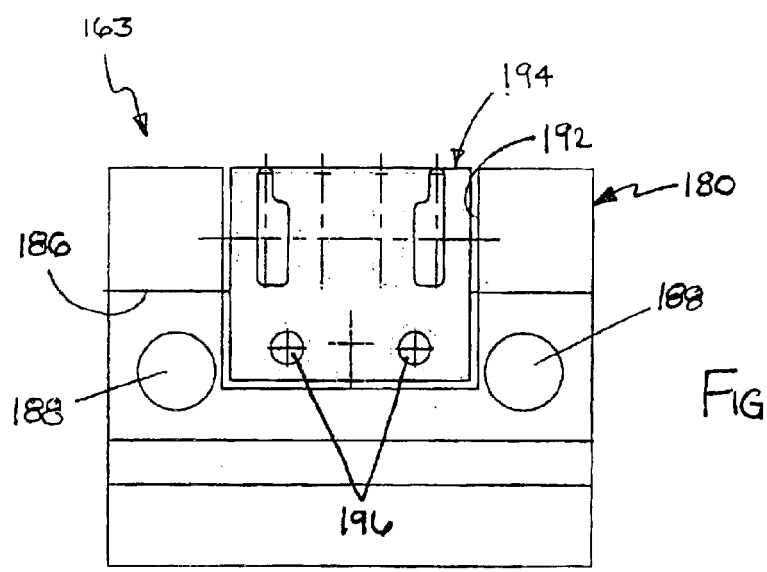
FIG. 9 is an assembled view of the hinge block of FIG. 8.

Referring to FIGS. 8 and 9, core component 163 includes a hinge block 180 sized for receipt within channel 160. In a particular embodiment, hinge block 180 includes first and second side surfaces 182, 184. Side surface 182 includes a first recessed portion 186 and at least one retention member 188 disposed within recessed portion 186. A duct 190 extends lengthwise through hinge block 180 and is sized for receiving visor support rod 64.

Hinge block 180 also includes a second recessed portion 192. A generally U-shaped detent clamp 194 is positioned about second recessed portion 192 and surrounds a portion of visor support rod 64. Clamp 192 is retained on hinge block 180 by rivets 196. Rod 64 has flats (not shown) that cooperate with detent clamp 194 to hold/lift the visor in a storage position adjacent a vehicle headliner.

Figure 10:
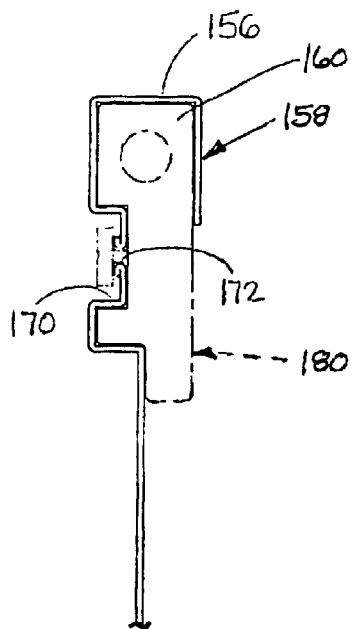
FIG. 10 is a detailed view of FIG. 7 showing the hinge block of FIGS. 8 and 9 in phantom.

Referring to FIGS. 10 and 11, core component 163 is movably received within channel 160. Once hinge block is received in channel 160, retention members 188 are secured to hinge block 180 through opening 172. Alternatively, retention members may be integrally formed with hinge block 180 and inserted through enlarged end portion 174 of opening 172 as hinge block is inserted into channel 160. Retention members 188, when connected to hinge block 180, are positioned in recess 170 and limit movement of hinge block 180 within channel 160. More particularly, retention members 188 abut opposing ends of opening 172 as hinge block is moved within channel 160.

The features of the present invention will be better appreciated with reference to the method of assembly of sun visor assembly 20. In an embodiment, the "butterfly" or folded-over outer covering 22 is formed in accordance with conventional methods well-known in the art. Notably, cut-out 31 is punched into foundation 24 by conventional means prior to cover 26 being adhered thereto.

The core components of sun visor assembly 20 are positioned within channel 60 of reinforcing core plate 50.

Track 66 and sliding member 68 may be pre-assembled and then placed into channel 60 so that core alignment elements 70 fit into the corresponding holes formed in core plate 50. Optionally, core alignment elements 70 can be adhered within the holes in core plate 50 to further inhibit movement of track 66 and sliding member 68 within channel 60.

After the required features have been punched into foundation 24, reinforcing core plate 50 is secured to foundation half 30 and cover 26 is secured to foundation 24. As an optional step, desirable when the vanity mirror includes lighting as in the disclosed embodiment, apertures 40 (FIG. 3) may be pre-formed into cover 26 before it is adhered to foundation 22. Advantageously, only edge 35 and saw-tooth edge 38 of cover 26 need be adhered to foundation 24. Any one of several adhesives known in the art can be used for this purpose.

Prior to halves 28 and 30 being secured together, pin assembly 32 is affixed to foundation 24 using a suitable adhesive. Also, vanity mirror assembly 34 may be heat staked to foundation 24 over cover 26. Advantageously, cover 26 is held securely in place between foundation 24 and the back of vanity mirror assembly 34.

Finally, halves 28 and 30 are secured together. An adhesive can be applied proximate the edge of halves 28 and 30, foundation 22 folded and then held together until the adhesive cures. Unlike the prior art, less reinforcing or nonstructural adhesives can be used to secure halves 28 and 30 together. Alternatively, halves 28 and 30 may be stitched or ultrasonically welded together, as is also known in the art. Although not expressly described, the exemplary method of assembly is also applicable to sun visor assembly 120.

It will be appreciated that reinforcing core plates 50, 150 permit the outer cover of sun visor 20, 120 to be manufactured out of inexpensive, less reinforcing materials, or out of traditional covering materials having a substantially thinner cross-section. The reinforcing core plates 50, 150 also function to eliminate the use of structural adhesives used to provide reinforcement. The reinforcing core plates 50, 150 accomplish these functions without sacrificing rigidity or resistance to flexion.

The present invention has been particularly shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. A sun visor assembly comprising:
   an outer covering including two covering halves;
   a reinforcing core plate attached to one of the covering halves, the reinforcing core plate including a substantially planar portion and a support flange that cooperates with the substantially planar portion to define a channel;
   a visor support rod; and
   at least one visor core component that rotatably engages the visor support rod, the visor core component received within the channel.

2. The sun visor assembly of claim 1, wherein a distal end of the support flange contacts the substantially planar portion.

3. The sun visor assembly of claim 1, wherein a distal end of the support flange is secured to the substantially planar portion.

4. The sun visor assembly of claim 1, wherein the visor core component is secured to the reinforcing core plate within the channel by at least one core alignment element.

5. The sun visor assembly of claim 4, wherein the core alignment element includes an upstanding peg.

6. The sun visor assembly of claim 1, wherein the at least one visor core component includes a track non-slidingly secured to the reinforcing core plate and a sliding member slidingly engaging the track.

7. The sun visor assembly of claim 1, wherein the outer covering includes an upholstery covered foam foundation.

8. The sun visor assembly of claim 7, wherein the foam foundation exhibits a hardness of less than about 50 Shore A.

9. The sun visor assembly of claim 1, wherein an upper edge of the reinforcing core plate is generally rounded.

10. The sun visor assembly of claim 9, wherein the rounded upper edge is substantially semi-circular in cross-section having a radius of at least about 3.2 mm.

11. The sun visor assembly of claim 1, wherein reinforcing core plate includes a rounded lower edge having a radius of at least 3.2 mm.

12. The sun visor of claim 1, wherein the support flange includes an elongated opening.

13. The sun visor of claim 12, wherein the visor core component includes at least one retention member that protrudes through the opening and limits movement of the visor core component.

14. A sun visor assembly comprising:
   an outer covering including two covering halves;
   a reinforcing core plate attached to one of the covering halves, the reinforcing core plate including a substantially planar portion and a support flange that cooperates with the substantially planar portion to define a channel;
   a visor support rod; and
   a track non-slidingly secured to the reinforcing core plate and a sliding member slidingly engaging the track, wherein the sliding member is rotatably secured to the support rod.

15. A sun visor assembly comprising:
   an outer covering including two covering halves;
   a reinforcing core plate attached to one of the covering halves, the reinforcing core plate including a substantially planar portion and a support flange that cooperates with the substantially planar portion to define a channel;
   a visor support rod; and
   a hinge block received within the channel, wherein the hinge block is rotatably secured to the support rod.

* * * * *